Sept. 29, 1925.  A. PONDELICK  1,555,606
PISTON
Filed June 15, 1923
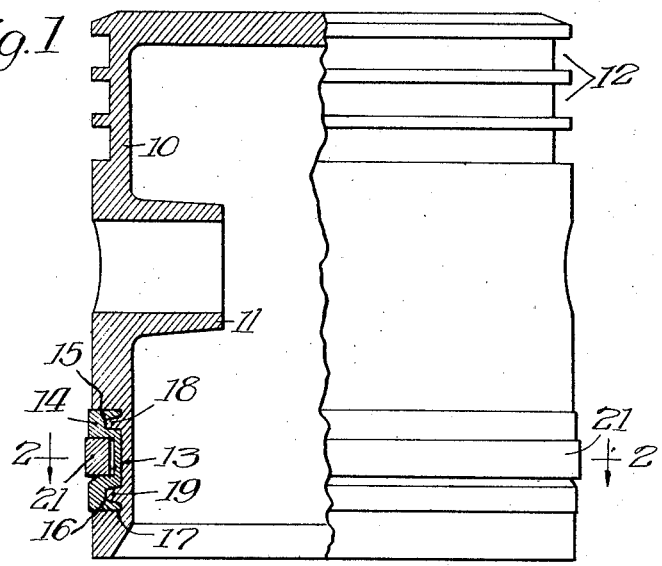
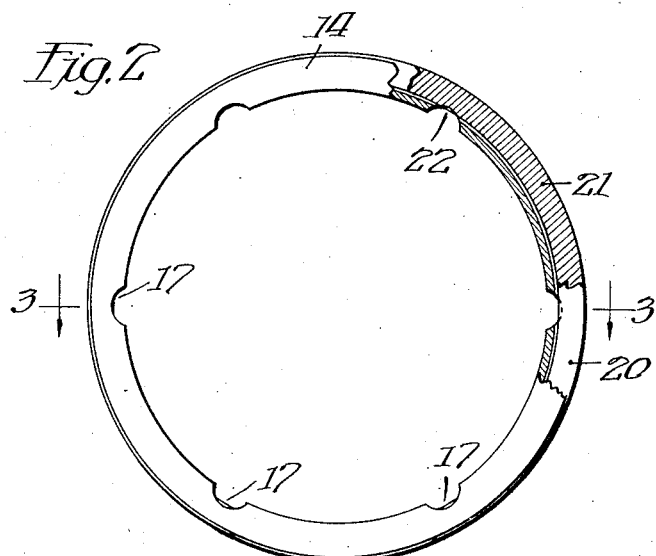
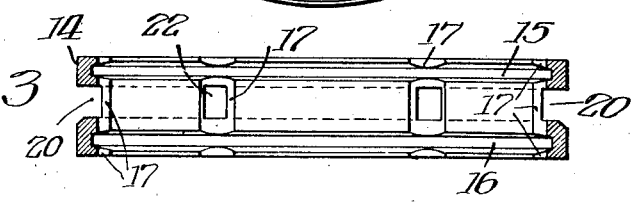
Inventor:
Anton Pondelick,
By George S. Oines
Atty.

Patented Sept. 29, 1925.

1,555,606

UNITED STATES PATENT OFFICE.

ANTON PONDELICK, OF CHICAGO, ILLINOIS.

PISTON.

Application filed June 15, 1923. Serial No. 645,507.

*To all whom it may concern:*

Be it known that I, ANTON PONDELICK, a citizen of the United States, and a resident of Chicago, in the county of Cook and State of Illinois, have invented certain new and useful Improvements in Pistons, of which the following is a specification.

My invention relates to pistons, particularly to pistons for explosive engines. My invention refers to that type of pistons in which the piston body is constructed of some light material such as aluminum or aluminum alloy, and wearing rings or bands of heavier metal such as cast iron are associated with the body to take up the wear while the piston travels in the cylinder. The important object of my invention is to provide improved construction and arrangement for intimately interconnecting the bearing bands with the piston body to prevent such displacement of the bands as might tend to wear away the metal of the body, and also to prevent rattling of the bands during the rapid reciprocation of the piston, my improved arrangement causing the bands to wear uniformly and with the least friction, and causing the engine to operate noiselessly and efficiently.

The features of my invention are incorporated in the structure shown on the accompanying drawing, in which—

Fig. 1 is a side elevational view of a piston structure partly in vertical diametral section showing the bearing band thereon.

Fig. 2 is a plan view of the bearing band structure partly in section, on plane 2—2, Fig. 1, and Fig. 3 is a sectional view on plane 3—3, Fig. 2.

The body 10 of the piston structure has the radially extending bearing lugs 11 for journaling the connecting rod wrist pin (not shown). The body is of aluminum or other light weight metal and at its upper end has the usual peripheral notches 12 for piston or packing rings. Near its lower end the body has the rectangular external groove or channel 13 which extends entirely around the body and receives the bearing ring 14. At its inner side the bearing ring has the upper and lower peripheral grooves 15 and 16 and the transverse grooves 17. The bearing ring is placed in the mould for the body part and then when the aluminum is cast into the mould it will enter the grooves 15 and 16 in the form of annular tongues 18 and 19 and this tongue and groove engagement securely locks the ring against vertical displacement on the body. The metal also enters the transverse grooves 17 so that the ring is locked against rotational movement on the piston body.

The bearing ring has the external circumferential channel 20 for receiving the packing ring 21 which is usually in the form of a split ring so that it may be readily applied. The channel 20 may be formed in the ring before it is applied to the piston body or, a solid ring can be secured in the piston body and the channel 20 then cut therein. The cutting may be of sufficient depth to extend a distance through the transverse grooves 17 to leave openings 22 in the ring wall through which the aluminum will be exposed in the channel 20. During the unequal expansion of the aluminum and cast iron as the temperature changes these openings 22 will permit the aluminum to be relieved of its expansion and contraction strains and will keep these strains from the ring. The longitudinal grooves 15 and 16 and the transverse grooves 17 will keep the ring accurately seated in the channel 13 and will prevent displacement thereof so that it will always travel smoothly and accurately against the cylinder walls with minimum friction and uniform wear.

I do not desire to be limited to the exact construction and arrangement shown and described as changes and modifications can be made which will still come within the scope of the invention.

I claim as follows:

1. In a piston structure, the combination of the cylindrical body having a circumferential channel of rectangular cross section, a bearing ring fitting in said channel, said bearing ring having longitudinal and transverse grooves on its inner side, and extensions from the cylindrical wall of said channel engaging in said grooves to lock the ring to the body.

2. In a piston structure, the combination of the cylindrical piston wall having a circumferential channel of rectangular cross section, a bearing ring in said channel, an annular groove in the inner face of said ring, transverse grooves in the inner face of said rings, and tongues on said body engaging in said grooves to lock said ring to the body.

3. In a piston structure, the combination of the cylindrical body having a circumferential channel of rectangular cross section, said body being of cast metal, a bearing ring fitting in said channel, said ring having an annular groove on its inner side adjacent each edge thereof and having transverse grooves, the metal of the body filling said grooves during casting to form tongues for cooperating with said grooves to interlock said ring with said body.

4. In a piston structure, the combination of the cylindrical body having a circumferential channel, a bearing ring fitting in said channel, said ring having internal circumferentially extending grooves adjacent its edges, said ring having an external channel for receiving a packing ring, there being holes through the base of said channel, and tongues on said body for engaging in said grooves and holes to interlock said ring with said body.

5. In a piston structure, the combination of the cylindrical body formed of cast aluminum and having a circumferential channel of rectangular cross section, a bearing ring of cast iron for engaging in said channel, said ring having an external channel for receiving a packing ring, circumferentially extending grooves on the inner side of said ring near its edges and holes through the ring base between said grooves, said ring being placed in the mould for the piston so that the cast aluminum will securely engage in said grooves and in said holes to securely interlock said ring with the body.

In witness whereof, I hereunto subscribe my name this 6th day of June A. D., 1923.

ANTON PONDELICK.